United States Patent
Patel et al.

(10) Patent No.: US 11,088,838 B2
(45) Date of Patent: Aug. 10, 2021

(54) AUTOMATED AUTHENTICATION OF A NEW NETWORK ELEMENT

(71) Applicant: PALO ALTO NETWORKS, INC., Santa Clara, CA (US)

(72) Inventors: Tushar J. Patel, Sunnyvale, CA (US); Anupam Bharali, San Jose, CA (US); Stan Lee, Santa Clara, CA (US)

(73) Assignee: PALO ALTO NETWORKS, INC., Santa Clara, CA (US)

( * ) Notice: Subject to any disclaimer, the term of this patent is extended or adjusted under 35 U.S.C. 154(b) by 255 days.

(21) Appl. No.: 15/977,668

(22) Filed: May 11, 2018

(65) Prior Publication Data

US 2019/0349198 A1  Nov. 14, 2019

(51) Int. Cl.
*H04L 9/32* (2006.01)
*H04L 9/06* (2006.01)
*H04L 9/08* (2006.01)
*H04L 29/06* (2006.01)

(52) U.S. Cl.
CPC .......... *H04L 9/3228* (2013.01); *H04L 9/0631* (2013.01); *H04L 9/0656* (2013.01); *H04L 9/0869* (2013.01); *H04L 63/08* (2013.01); *H04L 2463/121* (2013.01)

(58) Field of Classification Search
None
See application file for complete search history.

(56) References Cited

U.S. PATENT DOCUMENTS

| | | | | |
|---|---|---|---|---|
| 2012/0324093 A1* | 12/2012 | He | .................. | G06F 11/3055 709/224 |
| 2013/0010958 A1* | 1/2013 | Yao | ................. | H04L 63/102 380/270 |
| 2014/0281506 A1* | 9/2014 | Redberg | ............. | H04L 63/0272 713/159 |
| 2014/0282935 A1* | 9/2014 | Lal | ........................ | G06F 21/72 726/6 |
| 2018/0041339 A1* | 2/2018 | Lee | .................... | G06Q 20/3274 |

OTHER PUBLICATIONS

Cho et al., Enhanced Security Protocols for EPC Global Gen2 on Smart Grid Network, 2010 Proceedings of the 5th International Conference on Ubiquitous Information Technologies and Applications, pp. 1-5 (Year: 2010).*

Huang et al., RFID Systems Integrated OTP Security Authentication Design, 2013 Asia-Pacific Signal and Information Processing Association Annual Summit and Conference, pp. 1-8 (Year: 2013).*

* cited by examiner

*Primary Examiner* — Luu T Pham
*Assistant Examiner* — Edward X Long
(74) *Attorney, Agent, or Firm* — Gilliam IP PLLC

(57) ABSTRACT

The technology presented herein enables a new network element to be authenticated to other network elements automatically. In a particular embodiment, a method provides determining a current time relative to a first time. The first time is known to the new network element and a provisioning network element. The method further provides generating first beacon data using seed data stored on the new network element and the current time and generating keying data using the first beacon data and identification information associated with the new network element. The method also provides identifying a first one-time pad (OTP) from the keying data and using the first OTP to encrypt an authentication request for transfer from the new network element to the provisioning network element.

20 Claims, 7 Drawing Sheets

AUTOMATED AUTHENTICATION OF A NEW NETWORK ELEMENT

TECHNICAL BACKGROUND

To ensure communications between networked elements, such as computing systems and devices, remain secure, a network element must prove it is authorized to communicate with another network element. Some common ways for a network element to provide such proof is through encrypting communications with a key known only to authorized elements or using a certificate known only to authorized elements. When a network element first comes online (e.g., first connected to the network or first initiated), the network element does not necessarily know the key or certificate that needs to be used for communications. A user, such as a network administrator, may be able to provide the most up to date key or certificate to the network element. However, such an arrangement may be difficult in practice, especially in cases where many network elements are continually being added to or removed from the network (e.g., as may be the case when network elements are virtualized computing systems and/or devices that can be instantiated and taken down based on demand).

OVERVIEW

The technology presented herein enables a new network element to be authenticated to other network elements automatically. In a particular embodiment, a method provides determining a current time relative to a first time. The first time is known to the new network element and a provisioning network element. The method further provides generating first beacon data using seed data stored on the new network element and the current time and generating keying data using the first beacon data and identification information associated with the new network element. The method also provides identifying a first one-time pad (OTP) from the keying data and using the first OTP to encrypt an authentication request for transfer from the new network element to the provisioning network element.

In some examples, the method further provides receiving a first response to the authentication request from the provisioning network element and decrypting the first response using the first OTP to obtain authentication information from the first response. In these examples, the method may further provide using the authentication information to authenticate the new network element to a second network element.

In some examples, a seed file includes the seed data and the seed file is present on the new network element when the new network element is first instantiated. In these examples, the seed file may be unique to an entity associated with the new network element.

In some examples, the method provides that generating the first beacon data using the seed data stored on the new network element and the current time comprises inputting the seed data and the current time into an Advanced Encryption Standard (AES) algorithm, which responsively outputs the first beacon data.

In some examples, the method provides that identifying a first one-time pad (OTP) from the keying data comprises using an index to locate the first OTP from within the keying data.

In some examples, the method provides using a short-tag to authenticate the keying data before using the first OTP to encrypt an authentication request. In these examples, the method may further provide receiving the short-tag in the new network element from a tag server on an out of band channel. The provisioning network element also receives the short-tag in these examples.

In another example, an apparatus for a new network element is provided having one or more computer readable storage media and a processing system operatively coupled with the one or more computer readable storage media. Program instructions stored on the one or more computer readable storage media, when read and executed by the processing system, direct the processing system to determine a current time relative to a first time. The first time is known to the new network element and a provisioning network element. The program instructions further direct the processing system to generate first beacon data using seed data stored on the new network element and the current time and generate keying data using the first beacon data and identification information associated with the new network element. The program instructions also direct the processing system to identify a first one-time pad (OTP) from the keying data and use the first OTP to encrypt an authentication request for transfer from the new network element to the provisioning network element.

DETAILED DESCRIPTION

When a new network element needs to authenticate itself, technology described below allows the new network element to verify its credentials for authentication without a user needing to manually provide such credentials (e.g., an encryption key or certificate). In particular, using data known or available to both the new network element and another, already authenticated network element, the new network element is able to request information that will authenticate it to other network elements during future communications (e.g., an encryption key or certificate). If the request can be decoded by the other network element (without having to receive any other information from the new network element), then it can be assumed with near 100% certainty that the new network element making the request is authorized to receive a response.

Figure 1:
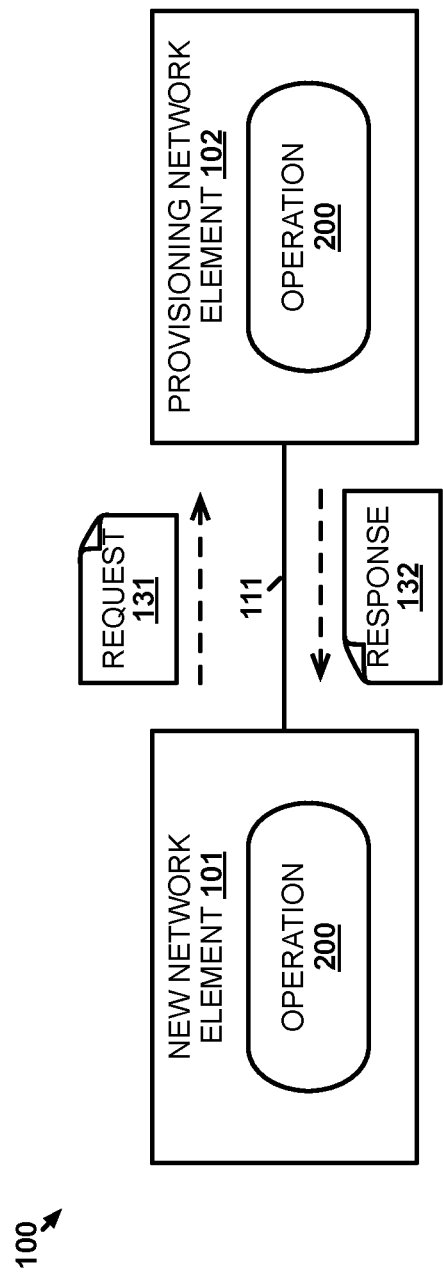
FIG. 1 illustrates a network environment for automatically authenticating a new network element.

FIG. 1 illustrates network environment 100 for automatically authenticating a new network element. Network environment 100 includes new network element 101 and provisioning network element 102. New network element 101 and provisioning network element 102 communicate over communication link 111. Communication link 111 may be any type of wired and/or wireless communication link and may include intervening systems, networks, and devices.

In operation, new network element 101 may be any type of system or device having communication circuitry necessary to communicate with at least provisioning network element 102 over communication link 111. New network element 101 may be a physical network element or may be virtualized on a physical host computing system. For example, new network element 101 may be a virtual machine instantiated on a host. In order to operate as desired, new network element 101 needs to authenticate itself to one or more other network elements with which it will be communicating. For instance, other network elements may provide network or application services that new network element 101 may access over a communication network. These other network elements may have security measures implemented that ensure only authenticated network elements can make use of the features provided by the other network elements (e.g., may require encryption or certificates). Provisioning network element 102 exists to provide new network element 101 with the information necessary to comply with those security measures but first new network element 101 must authenticate itself to provisioning network element 102. Operation 200 is performed by both new network element 101 and provisioning network element 102 to authenticate new network element 101, as described below.

Figure 2:
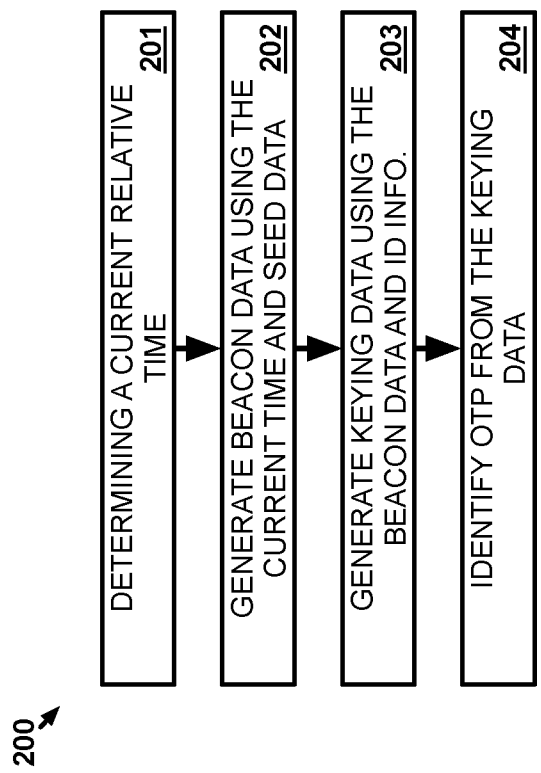
FIG. 2 illustrates an operation of the network environment to automatically authenticate a new network element.

FIG. 2 illustrates operation 200 of network environment 100 to automatically authenticate a new network element. New network element 101 and provisioning network element 102 both determine a current time relative to a designated reference time (201). Depending on the desired level of granularity, the current time may comprise a number of minutes, seconds, milliseconds, or otherwise, from the designated time. Regardless of what time is chosen to be the designated reference time known to each element, the reference time must be the same for both new network element 101 and provisioning network element 102 to ensure operation 200 produces the same results at each element. In some examples, new network element 101 may be associated with an entity, such as a customer of a company providing the features that new network element 101 needs to access. In these examples, the reference time may be unique to network elements associated with that entity to help differentiate its authentication procedure from elements associated with another entity that similarly perform operation 200. To ensure both new network element 101 and provisioning network element 102 use the same current time, the current time may be defined in windows of time (e.g., five minute intervals) such that the current time is effectively the same for anytime within a particular window.

New network element 101 and provisioning network element 102 generate beacon data using seed data, which is stored on both new network element 101 and provisioning network element 102 (202). The seed data is simply some amount of random data (e.g., 128 KB of random 1s and 0s) but that random data is the same on both new network element 101 and provisioning network element 102. Like the reference time from above, the seed data may be associated with and unique to an entity such that network elements associated with other entities have other seed data unique to each respective entity. The new network element 101 may be provided with the seed data by a manufacturer of new network element 101, vendor of new network element 101, or other entity before beginning operation 200. If new network element 101 is a virtualized element, then a template used to create new network element 101 on a host computing system may include the seed data such that any network element instantiated using the template has the same seed data automatically. Any type of encryption algorithm, or cryptographically secure pseudo-random function, may be used to generate the beacon data. The seed data and the current time are used as inputs into the algorithm. For instance, one of the seed data and the current time may be used as the data for encryption while the other may be used as the key. In some examples, data representing the current time may be input into the algorithm unaltered while other examples may input the current time after performing a derivation of some kind on the current time.

Keying data is then generated using the beacon data and identification information associated with new network element 101 (203). The keying data is generated using an encryption algorithm with the beacon data and data representing the identification information as inputs (e.g., one being the data and the other being the key). Any type of encryption algorithm, or cryptographically secure pseudo-random function, may be used to generate the keying data. The identification information may be any type of information that describes new network element 101, new network element 101's relationship to provisioning network element 102 (e.g., that new network element 101 is operated by a customer of a service provider having provisioning network element 102), an entity associated with new network element 101, or some other type of relevant information— including combinations thereof. For example, the identification information may include a serial number of new network element 101, a universal unique identifier (UUID) for new network element 101, customer (i.e., entity) identifier, a tenant identifier, and/or some other type of information.

A one-time pad (OTP) is identified from the keying data (204). The OTP may comprise the entirety of the keying data or may comprise a subset of the keying data. For example, the OTP may be a two byte subset of the keying data and is identified within the keying data from an index (e.g., the index could indicate that the OTP begins 5 bytes from the start of the keying data). The index may be manually provided to new network element 101 and provisioning network element 102 (e.g., via input from a user), may be included at manufacture, install, or instantiation time, or may be provided to provisioning network element 102 by other means.

Referring back to FIG. 1, new network element 101 uses the OTP to encrypt authentication request 131 using an OTP method of data encryption. New network element 101 transfers authentication request 131 to provisioning network element 102. Provisioning network element 102 may not perform operation 200 until authentication request 131 is received or may have performed operation 200 beforehand. Regardless, since both new network element 101 and provisioning network element 102 performed the exact same operation 200, the OTP resulting from operation 200 is the same. Thus, provisioning network element 102 is able to simply use the OTP to decrypt authentication request 131. If new network element 101 was not an authorized network element, then operation 200 would result in a different OTP than provisioning network element 102's performance of operation 200 and provisioning network element 102 would not be able to decrypt authentication request 131.

Since provisioning network element 102 is able to decrypt authentication request 131 in this example, provisioning network element 102 recognizes new network element 101 as an authorized network element and transfers authentication response 132 in response to authentication request 131.

Authentication response 132 includes any information, such as an encryption type identifier, encryption key, certificate, etc., that new network element 101 may need to access other network elements associated with the authorization provided by provisioning network element 102. Authentication response 132 is encrypted using the same OTP determined in operation 200 and, upon receipt, new network element 101 is able to use that OTP to decrypt authentication response 132 and extract the information therein.

Advantageously, information intended to remain secret, such as identity and encryption keys, are never sent nor communicated directly between new network element 101 and provisioning network element 102. Moreover, the implementation is highly scalable because of the true decoupling it provides for multiple simultaneous authentication and authorization of new network element (i.e., authenticating other new network elements in addition to new network element 101). This solves issues with large scale parallel transactions, such as those common in business-to-consumer interactions.

Figure 3:
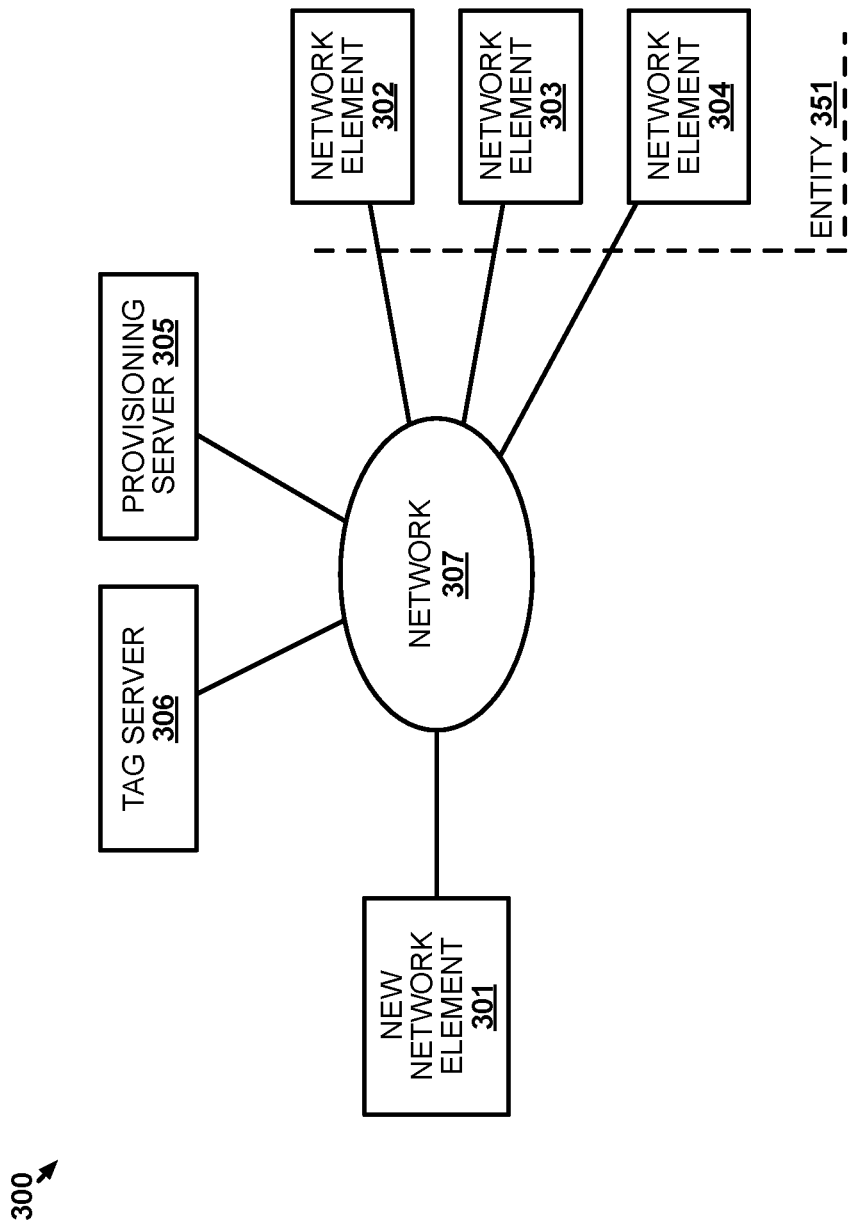
FIG. 3 illustrates another network environment for automatically authenticating a new network element.

FIG. 3 illustrates network environment 300 for automatically authenticating a new network element. Network environment 300 includes new network element 301, network element 302, network element 303, network element 304, provisioning server 305, short-tag server 306, and network 307. Wired and/or wireless communication links connect each of new network element 301, network element 302, network element 303, network element 304, provisioning server 305, and short-tag server 306 to network 307. Network 307 may comprise a single network or may be a network created from the combination of multiple networks, such as one or more local area networks (LANs) and/or the Internet.

In operation, network element 302, network element 303, and network element 304 are associated with entity 351 and provide functionality for which new network element 301 will need to exchange communications. For example, network element 302, network element 303, and network element 304 may be hosted by a company that provides services to various customers of the company (e.g., entity 351 may be a customer of the company). New network element 301 may be a network element of entity 351 that will need to communicate with one or more of network element 302, network element 303, and network element 304. For security reasons, new network element 301 will need to be authenticated to network element 302, network element 303, and network element 304. When new network element 301 first comes online, new network element 301 will not have the information necessary to communicate with network element 302, network element 303, and network element 304. Providing new network element 301 with that necessary information needs to also be done securely so that other network elements that should not be able to communicate with network element 302, network element 303, and network element 304 cannot also obtain that information.

Figure 4:
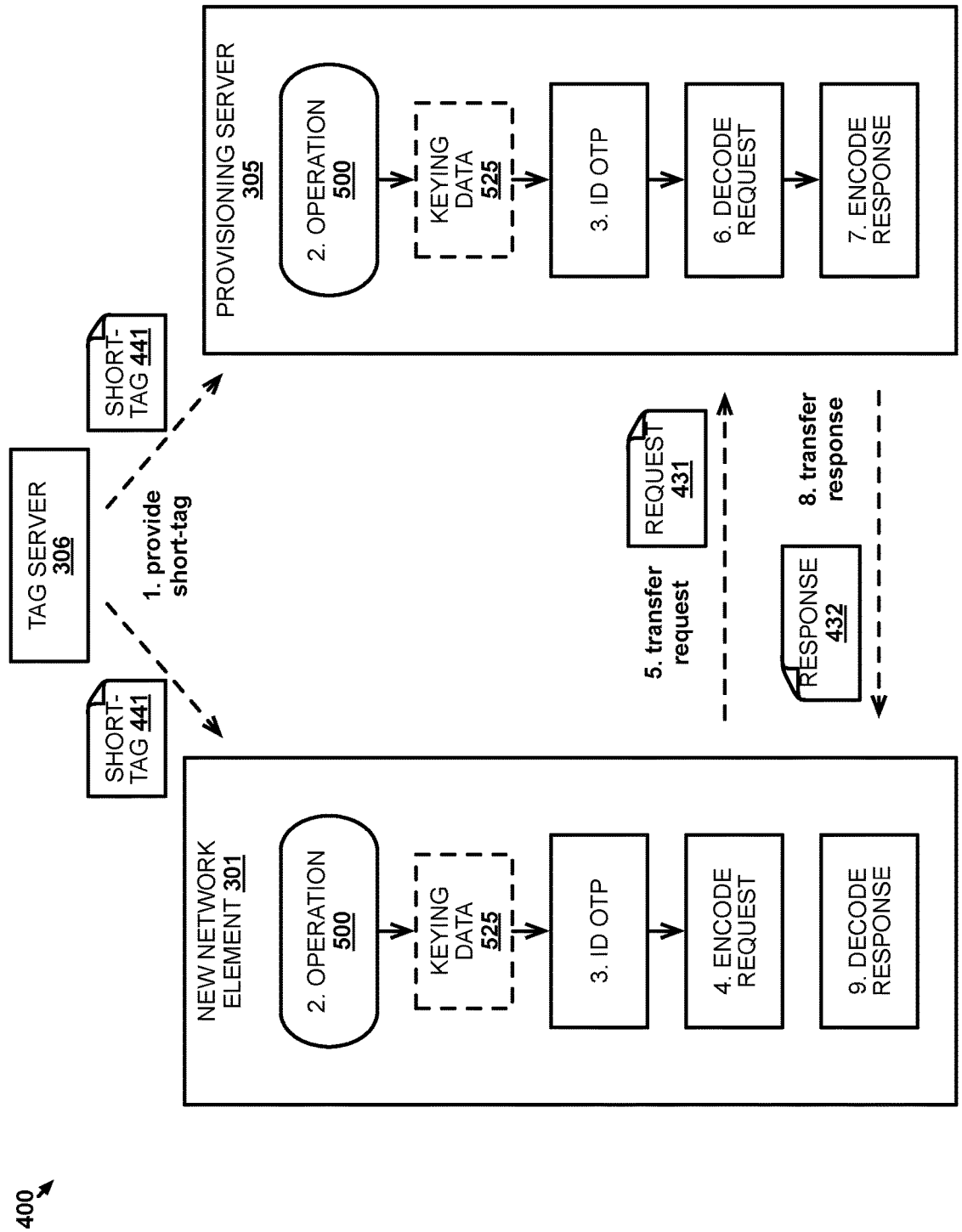
FIG. 4 illustrates a scenario for the other network environment to automatically authenticate a new network element.

FIG. 4 illustrates scenario 400 for network environment 300 to automatically authenticate a new network element. In scenario 400, new network element 301 and provisioning server 305 both receive the same short-tag, short-tag 441, at step 1 from short-tag server 306. Short-tag 441 is transferred over out of band links between new network element 301 and provisioning server 305, respectively. New network element 301 may request short-tag 441 from short-tag server 306 upon being instantiated or otherwise brought online. New network element 301 and provisioning server 305 both perform operation 500 at step 2 in order to generate keying data that can be authenticated using short-tag 441.

Figure 5:
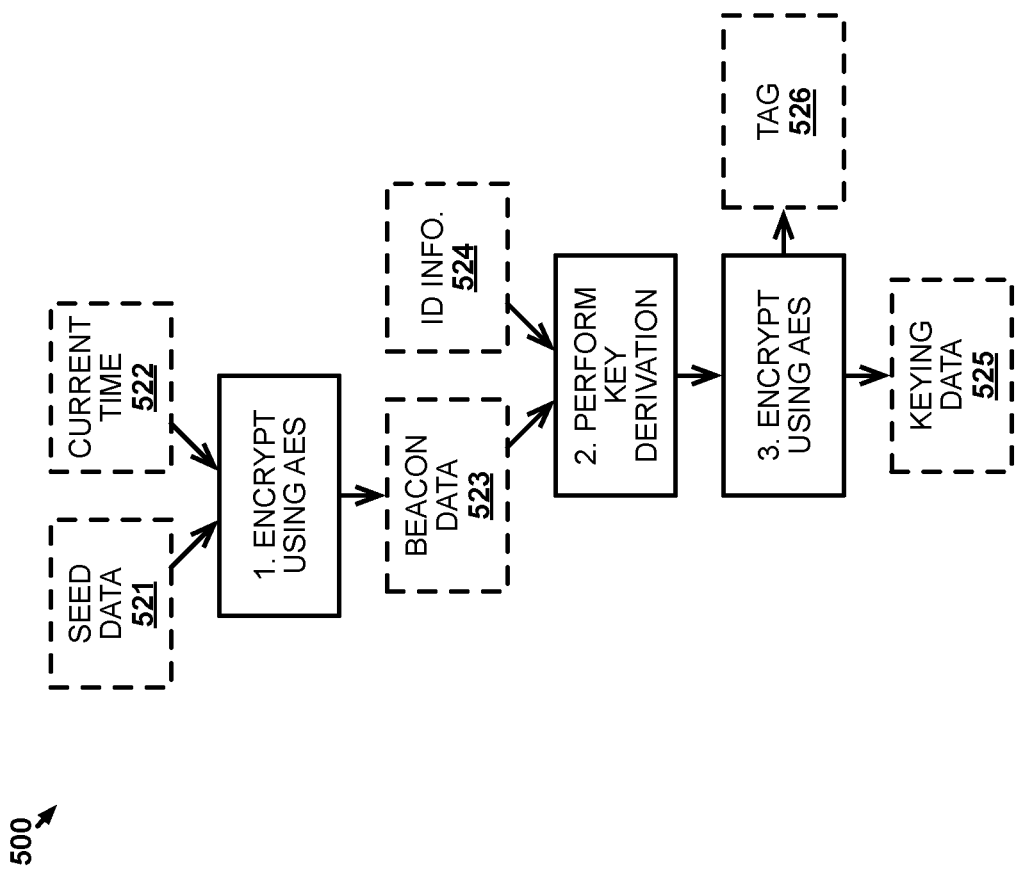
FIG. 5 illustrates an operation for the other network environment to automatically authenticate a new network element.

FIG. 5 illustrates operation 500 for network environment 300 to automatically authenticate a new network element. In operation 500, seed data 521 and current time 522 are used as input into an Advanced Encryption Standard (AES) encryption algorithm, which outputs beacon data 523 using seed data 521 and current time 522. In this example, seed data 521 associated with entity 351 is included in a seed file that is stored on new network element 301 before new network element 301 is brought online to network 307. The seed file may be encrypted until needed for step 1 and then decrypted into memory, used for step 1, and then closed out of memory. Provisioning server 305 has similarly stored the seed file before operation 500 so that provisioning server 305 can authenticate new network elements associated with entity 351, including new network element 301. Provisioning server 305 may store other seed files that have seed data associated with other entities since provisioning server 305 may be used to authenticate new network elements associated with those entities in addition to those associated with entity 351. Also in this example, current time 522 comprises a 5 minute block of time in a sequence of 5 minute time blocks from a reference time (other examples may use different block sizes). Using less precise blocks of time to represent current time 522 greatly reduces the possibility that new network element 301 and provisioning server 305 will determine different current times due to factors like differences in their local clocks or differences in when operation 500 is started. In some examples, the AES encryption algorithm may use the SP800-90A derivation function to ensure strength of encryption irrespective of seed data 521 and current time 522.

A key derivation is performed at step 2 on beacon data 523 and identification information 524 using National Institute of Standards and Technology Pseudorandom Functions (SP) 800-108. Identification information 524 may include a serial number of new network element 301, a universal unique identifier (UUID) for new network element 301, a customer identifier for entity 351, a tenant identifier, and/or some other type of information. The key derivation makes beacon data 523 unique among other elements associated with entity 351 that may also be requesting authentication during the 5 minute period of current time 522 using the same seed data 521 associated with entity 351. After being subject to the key derivation, beacon data 523 and identification information 524 are then encrypted at step 3 using an encryption algorithm that outputs keying data 525 from the inputs. For example, AES-GCM (256 bit key) may be used because it provides authenticated encryption and decryption, which provides validation. Keying data 525 will be the same from both new network element 301 and provisioning server 305 at the end of operation 500 since new network element 301 is properly associated with entity 351. In this example, the encryption at step 3 further outputs tag 526 which is data used for authenticating keying data 525, as discussed with respect to FIG. 6 below.

Referring back to scenario 400, once keying data 525 has been created from operation 500, the OTP that should be used for encrypting authentication request 431 is identified at step 3 from within the data of keying data 525. The OTP is found from within keying data 525. A predefined index may be used to identify the data representing the OTP from within keying data 525. The index may be a simple scalar offset value that points to where in keying data 525 the OTP is located. For example, the index may point to a bit (or byte) as the starting point in keying data 525 for the OTP and the OTP comprises the data that extends from that starting point to a predefined data size. For added security by reducing the likelihood that the index can be guessed, the index may be a block, skip, and scalar offset within keying data 525. Authentication request 431 may be explicitly request authentication information necessary for new network element 301 to communicate with network element 302, network element 303, and network element 304 or the mere fact that provisioning server 305 can decrypt new network element 301 may imply that new network element 301 is requesting the authentication information.

New network element 301 uses the OTP identified from keying data 525 to perform OTP encoding at step 4 on authentication request 431. The encoded authentication request 431 is transferred at step 5 by new network element 301 to provisioning server 305. Upon receiving authentication request 431, provisioning server 305 uses the OTP identified from keying data 525 to decode at step 6 the OTP encoding of authentication request 431. Given that provisioning server 305 can decode authentication request 431, provisioning server 305 can assume that new network element 301 is authorized to receive the requested authentication information because it would be effectively impossible for a non-authorized device to have calculated or guessed the OTP identified from keying data 525. Accordingly, provisioning server 305 uses the OTP identified from keying data 525 to perform OTP encoding at step 7 on authentication response 432. Encoded authentication response 432 is transferred at step 8 by provisioning server 305 to new network element 301. New network element 301 decodes authentication response 432 at step 9 using the OTP identified from keying data 525 to obtain the authentication information therein.

Once the authentication information is obtained from authentication response 432, new network element 301 can use the authentication information to communicate with any one of network element 302, network element 303, and network element 304, which expect communications transferred in accordance with the authentication information. new network element 301 is therefore able to begin communicating with network element 302, network element 303, and network element 304 without having to first exchange information that could be intercepted by a man in the middle attack or otherwise have to be manually provisioned to new network element 301.

Figure 6:
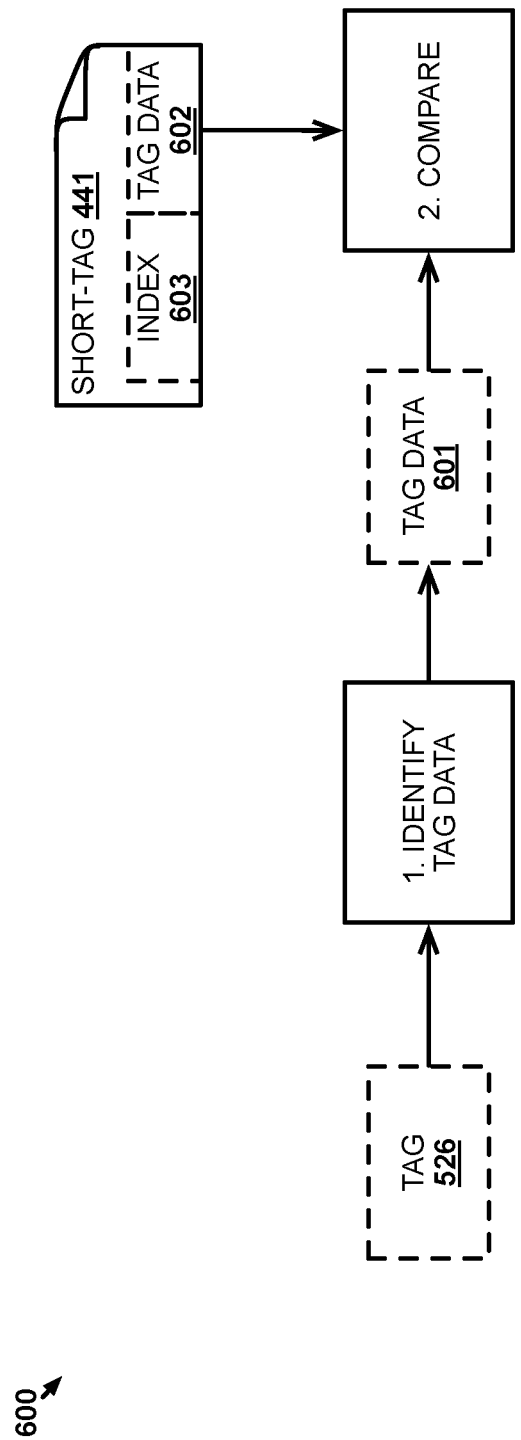
FIG. 6 illustrates a scenario for the other network environment to automatically authenticate a new network element.

FIG. 6 illustrates scenario 600 for network environment 300 to automatically authenticate a new network element. Scenario 600 is an example of how short-tag 441 is used to authenticate the OTP used by new network element 301 and provisioning server 305 in scenario 400 before exchanging authentication request 431 and authentication response 432 using that the identified OTP. Authenticating that the OTP is correct before using the OTP to encode a message avoids the unnecessary use of encoding/decoding resources at new network element 301 and provisioning server 305 if the OTP is found to not be authentic.

In scenario 600, tag data 601 is identified at step 1 from tag 526. In some cases, tag data 601 may comprise the entirety of tag 526 although only a portion of tag 526 may be used for tag data 601. For example, in order to keep the size of a short-tag down, only the first four and last three bytes of tag 526 may be used in tag data 601, which would result in tag data 601 being 7 bytes in size. Tag data 601 is then compared at step 2 to tag data 602 received in short-tag 441. If tag data 602 matches tag data 601, keying data 525, and the OTP identified therefrom, is authentic and can be used by new network element 301 and provisioning server 305 to exchange authentication request 431 and authentication response 432.

Tag data 602 will match tag data 601 if short-tag server 306 generated tag data 602 in the same way tag data 601 was generated for new network element 301 to authenticate itself to provisioning server 305. That is, short-tag server 306 performed operation 200 using the same inputs associated with new network element 301 (i.e., the same seed data 521, current time 522, and identification information 524) to generate a tag from which tag data 602 is identified. As such, it would be very difficult if not impossible for anything or anyone other than new network element 301 and provisioning server 305 to have tag data that matches tag data 602.

Short-tag 441 includes index 603 in addition to tag data 602. Index 603 comprises an indication of current time 522 since tag data 602 will only apply within current time 522 due to current time 522 being an input in operation 500. Preferably, index 603 is an encrypted, or otherwise transformed, version of current time 522 so that current time 522 cannot be determined should short-tag 441 be intercepted by an unauthorized system. If index 603 does not indicate current time 522, then a comparison between tag data 601 and tag data 602 will not result in a match and need not even be performed. A new short-tag may need to be requested and/or new tag data 601 may need to be generated such that the time indicated by the index is the same as the current time used to create the tag data. In one example, index 603 may comprise 2 bytes of information that, when added to the 7 bytes of tag data 602 in the example above results in short-tag 441 being 9 bytes in total.

Figure 7:
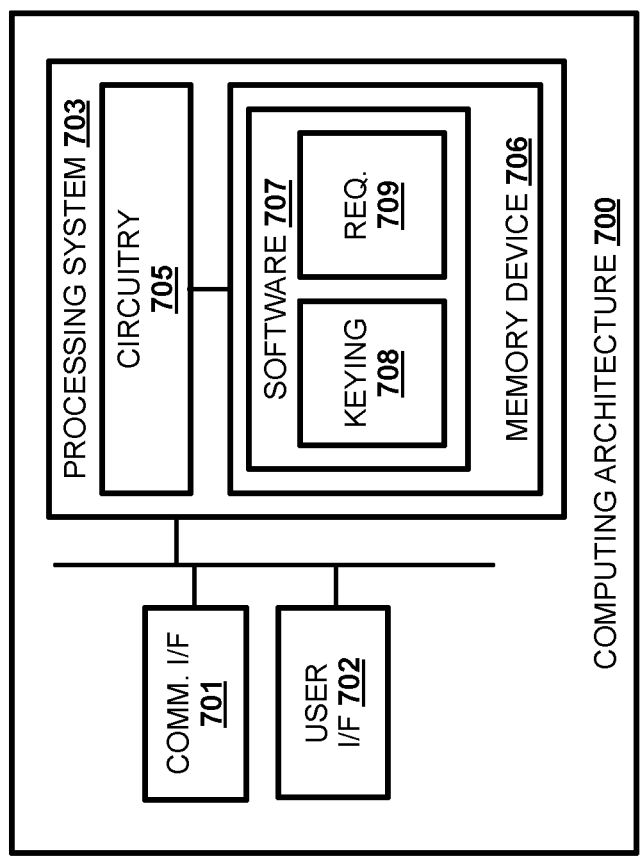
FIG. 7 illustrates a computing architecture to automatically authenticate a new network element.

FIG. 7 illustrates computing architecture 700 to automatically authenticate a new network element. Computing architecture 700 is an example computing architecture for new network element 101 and new network element 301, although alternative configurations may also be used. Computing architecture 700 may similarly be an example architecture for other elements described above, such as provisioning network element 102, provisioning server 305, short-tag server 306, and network elements 302-304, although alternative configurations may also be used. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises processing circuitry, such as a microprocessor, and other circuitry that retrieves and executes operating software 707 from memory device 706. Memory device 706 comprises a computer readable storage medium, such as a disk drive, flash drive, data storage circuitry, or some other memory apparatus that in no cases should be considered a mere propagated signal. Operating software 707 comprises computer programs, firmware, or some other form of machine-readable processing instructions. Operating software 707 includes keying data module 708 and authentication request module 709. Operating software 707 may further include an operating system, utilities, drivers, network interfaces, applications, or some other type of software. When executed by circuitry 705, operating software 707 directs processing system 703 to operate computing architecture 700 as described herein.

In particular, keying data module 708 directs processing system 703 to determine a current time relative to a first time, wherein the first time is known to the new network element and a provisioning network element. keying data module 708 further directs processing system 703 to generate first beacon data using seed data stored on the new network element and the current time and generate keying data using the first beacon data and identification information associated with the new network element. Authentication request module 709 directs processing system 703 to identify a first one-time pad (OTP) from the keying data and use the first OTP to encrypt an authentication request for transfer from the new network element to the provisioning network element.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   determining, by a first network element, a first time relative to a reference time, wherein the reference time is known to the first network element and a second network element;
   generating first encrypted data based, at least in part, on using seed data stored on the first network element and the first time with a first encryption algorithm or cryptographically secure pseudo-random function;
   generating second encrypted data based, at least in part, on using the first encrypted data and identification information associated with the first network element with a second encryption algorithm or cryptographically secure pseudo-random function, wherein the identification information comprises at least one of a serial number of the first network element, a universal unique identifier for the first network element, a customer identifier, and a tenant identifier;
   obtaining first tag data;
   authenticating the second encrypted data based, at least in part, on the first tag data and second tag data, wherein the second tag data are obtained based on generating the second encrypted data;
   determining a one-time pad (OTP) key from the second encrypted data; and
   encrypting an authentication request for transfer to the second network element based, at least in part, on the OTP key.

2. The method of claim 1, further comprising:
   decrypting a first response to the authentication request received from the second network element based, at least in part, on the OTP key;
   obtaining authentication information from the first response; and
   the first network element authenticating itself to a third network element based, at least in part, on the obtained authentication information.

3. The method of claim 1, wherein the seed data are indicated in a seed file, wherein the seed file is present on the first network element at a time of instantiation of the first network element.

4. The method of claim 1, wherein the first encryption algorithm or cryptographically secure pseudo-random function is an Advanced Encryption Standard (AES) algorithm.

5. The method of claim 1, wherein the OTP key corresponds to a subset of the second encrypted data, and wherein determining the OTP key from the second encrypted data comprises determining the OTP key from the second encrypted data based, at least in part, on an index.

6. A first network element comprising:
   a processor; and
   one or more computer readable storage media having program code stored thereon, the program code executable by the processor to cause the first network element to,
   determine a first time relative to a reference time, wherein the reference time is known to the first network element and a second network element;
   generate first encrypted data based, at least in part, on use of seed data stored on the first network element and the first time with a first encryption algorithm or cryptographically secure pseudo-random function;
   generate second encrypted data based, at least in part, on use of the first encrypted data and identification information associated with the first network element with a second encryption algorithm or cryptographically secure pseudo-random function, wherein the identification information comprises at least one of a serial number of the first network element, a universal unique identifier for the first network element, a customer identifier, and a tenant identifier;
   obtain first tag data;
   authenticate the second encrypted data based, at least in part, on the first tag data and second tag data, wherein the second tag data are obtained based on generation of the second encrypted data;
   determine a one-time pad (OTP) key from the second encrypted data; and
   encrypt an authentication request for transfer to the second network element based, at least in part, on the OTP key.

7. The first network element of claim 6, further comprising program code executable by the processor to cause the first network element to:
   decrypt a first response to the authentication request received from the second network element based, at least in part, on the OTP key;
   obtain authentication information from the first response; and
   authenticate to a third network element based, at least in part, on the obtained authentication information.

8. The first network element of claim 6, wherein the seed data are included in a seed file, wherein the seed file is present on the first network element at a time of instantiation of the first network element.

9. The first network element of claim 6, wherein the first encryption algorithm or cryptographically secure pseudo-random function is an Advanced Encryption Standard (AES) algorithm.

10. The first network element of claim 6, wherein the OTP key corresponds to a subset of the second encrypted data, and wherein the program code executable by the processor to cause the first network element to determine the OTP key comprises program code executable by the processor to cause the first network element to determine the OTP key from the second encrypted data based, at least in part, on an index.

11. One or more computer readable storage media having program code stored thereon for a new network element to authenticate itself to other network elements, the program code comprising instructions to:
 determine a first time relative to a reference time, wherein the reference time is known to the new network element and a provisioning network element;
 generate first encrypted data based, at least in part, on use of seed data stored on the new network element and the first time with a first encryption algorithm or cryptographically secure pseudo-random function;
 generate second encrypted data based, at least in part, on use of the first encrypted data and identification information associated with the new network element with a second encryption algorithm or cryptographically secure pseudo-random function, wherein the identification information comprises at least one of a serial number of the new network element, a universal unique identifier for the new network element, a customer identifier, and a tenant identifier;
 obtain first tag data;
 authenticate the second encrypted data based, at least in part, on the first tag data and second tag data, wherein the second tag data are obtained based on generation of the second encrypted data;
 determine a one-time pad (OTP) key from the second encrypted data; and
 encrypt an authentication request for transfer to the provisioning network element based, at least in part, on the OTP key.

12. The one or more computer readable storage media of claim 11, wherein the OTP key corresponds to a subset of the second encrypted data, and wherein the instructions to determine the OTP key from the second encrypted data comprise instructions to determine the OTP key from the second encrypted data based, at least in part, on an index.

13. The method of claim 1, wherein generating the first encrypted data comprises using the seed data as input data to the first encryption algorithm or cryptographically secure pseudo-random function and the first time as a key or using the first time as the input data and the seed data as the key.

14. The method of claim 1, wherein generating the second encrypted data comprises using the first encrypted data as input data to the second encryption algorithm or cryptographically secure pseudo-random function and the identification information as a key or using the identification information as the input data and the first encrypted data as the key.

15. The method of claim 1, wherein encrypting the authentication request comprises encrypting the authentication request with OTP encryption.

16. The first network element of claim 6, wherein the program code executable by the processor to cause the first network element to generate the first encrypted data comprises program code executable by the processor to cause the first network element to use the seed data as input data to the first encryption algorithm or cryptographically secure pseudo-random function and the first time as a key or use the first time as the input data and the seed data as the key.

17. The one or more computer readable storage media of claim 11, further comprising program code to:
 based on receipt of a response to the authentication request from the provisioning network element, decrypt the response based, at least in part, on the OTP key, wherein the response comprises authentication information; and
 authenticate the new network element to a first of the other network elements based, at least in part, on the authentication information.

18. The first network element of claim 6, wherein the program code executable by the processor to cause the first network element to generate the second encrypted data comprises program code executable by the processor to cause the first network element to use the first encrypted data as input data to the second encryption algorithm or cryptographically secure pseudo-random function and the identification information as a key or use the identification information as the input data and the first encrypted data as the key.

19. The one or more computer readable storage media of claim 11, wherein the instructions to generate the first encrypted data comprise instructions to use the seed data as input data to the first encryption algorithm or cryptographically secure pseudo-random function and the first time as a key or use the first time as the input data and the seed data as the key.

20. The one or more computer readable storage media of claim 11, wherein the instructions to generate the second encrypted data comprise instructions to use the first encrypted data as input data to the second encryption algorithm or cryptographically secure pseudo-random function and the identification information as a key or use the identification information as the input data and the first encrypted data as the key.

* * * * *